July 20, 1965 C. G. CAIN 3,195,916
TANDEM SPRING SUSPENSIONS
Filed May 1, 1961 3 Sheets-Sheet 1

INVENTOR.
CLIFFORD G. CAIN
BY
*Wallace, Kinzer and Dorn*
ATTORNEYS

July 20, 1965 C. G. CAIN 3,195,916
TANDEM SPRING SUSPENSIONS
Filed May 1, 1961 3 Sheets-Sheet 2

INVENTOR.
CLIFFORD G. CAIN
BY
Wallace, Kinzer and Dorn
ATTORNEYS

INVENTOR
CLIFFORD G. CAIN
BY Wallace, Kinzer and Dorn
ATTORNEYS

United States Patent Office 3,195,916
Patented July 20, 1965

3,195,916
TANDEM SPRING SUSPENSIONS
Clifford G. Cain, Springfield, Mo., assignor to Alaska Juneau Gold Mining Company, Springfield, Mo., a corporation of West Virginia
Filed May 1, 1961, Ser. No. 106,864
10 Claims. (Cl. 280—104.5)

This invention relates to spring suspensions particularly of the kind adapted for use on heavy-duty trailers that are commonly employed in cross-country freight transportation. This application is a continuation-in-part of application Serial No. 788,325, filed January 22, 1959, now abandoned.

Trailers of the foregoing kind are usually equipped with two axles arranged in tandem relation near the aft end of the trailer. Where these axles are each independently supported by springs below the frame of the trailer body, an impact impressed on the wheels associated with one axle only, as for instance when an uneven portion of the road is encountered, causes the one axle to bear the entire load. Therefore, it is desirable to be able to distribute such a load between both axles primarily to prevent damage to the freight. In this connection, it has heretofore been proposed to utilize pairs of springs aligned in tandem relation on opposite sides of the frame, and in turn the springs are so aligned transversely of the frame as to be paired up with each axle, one spring for each end of an axle. Further, it is proposed to interpose equalizing means in the spring system which, when an impact is impressed on one axle, will account for a distribution of the impact between the front and rear springs.

In those instances where the spring means are in the form of semi-elliptical compound leaf springs, two sets of springs depend in tandem relation from opposite sides of the trailer frame, and the axles are secured to the low or medial parts of the springs. The fore end of the front spring is supported by bracket means of one kind or another affixed to the frame, and substantially the same sort of support is provided for the aft end of the rear spring. Each set of springs has adjacent inner ends located midway of the two axles, and these adjacent inner ends respectively engage arms of the equalizer which extend fore and aft of the support for the equalizer relative to which the equalizer is free to pivot. In further explanation, the support for the equalizer is associated with a center bracket affixed to the frame of the vehicle midway of the axles. When a load is impressed on one spring due to an impact on the related axle and its wheels, that spring cants causing the equalizer to pivot clockwise or counterclockwise as the case may be due to the force established on the associated equalizer arm. At the same time, the opposite arm of the equalizer is lowered transmitting part of the impact load to the other spring and its axle and related wheels.

It will be recognized from the foregoing that pivotal action of the equalizer is essential, and in order that there will be no metal-to-metal contact between the equalizer and the support which allows pivotal movement of the equalizer, it has heretofore been proposed to interpose a resilient bearing or the like between the opposed metallic sections of the equalizer and its support. The interposition of such a resilent member of rubber or the like prevents "freezing" of metal parts that would otherwise be in metal-to-metal contact.

It is advantageous to be able to control movement of the equalizer to the extent that a predetermined amount of resistance to pivotal action of the equalizer is established, and the present invention is concerned with an improved mode of achieving such control, and such improvement constitutes the primary object of the present invention.

Specifically, it is an object of the present invention to interpose between the opposed surfaces of the equalizer and its support, relative to which the equalizer pivots, a compound bushing which includes but three essential elements, namely, a center sleeve or spacer of rigid material, an inner bearing of resilient material firmly secured to the inner surface of the sleeve, and an outer bearing of resilient material firmly secured to the outer surface of the sleeve. This unitary three-part bushing assembly is to be press-fitted into the opening in the equalizer, and the pivot support for the equalizer is to be press-fitted into the bushing assembly. In other words, the outer bearing of the bushing assembly has its outer surface in engagement with the inner arcuate surface at the midpoint of the equalizer which defines the aforesaid opening, and in turn the inner surface of the inner bearing engages about the pivot support. By selecting the bearings to have predetermined diameters, the inner bearing will have one predetermined state of compression between the rigid metallic sleeve of the bushing and the rigid or unyielding pivot support, and the outer bearing will have a different predetermined state of compression between the sleeve and the rigid or unyielding arcuate surface of the equalizer. Looked at another way, the outer bearing will have an outside diameter predetermined as greater than the diameter of the opening in the equalizer, and a resultant frictional force resists slippage of the equalizer on the outer bearing. The inner bearing will have an inside diameter predetermined as smaller than the outside diameter of the pivot support, and a resultant frictional force resists slippage of the inner bearing about the support. The frictional forces are different due to the different states of compression.

The net effect of the differential diameter compressions or frictional forces described above is that the bushing assembly as a whole will undergo slippage relative to the support pin or shaft for the equalizer only at a predetermined angle of tilt of the equalizer where the equilizer has exerted so much torque on the bushing as a whole that the frictional force or grip exerted by the inner bearing on the support is overcome. Until this angle is reached, the outer and inner bearings will merely twist in controlling action of the equalizer, and thus it will be seen that control of a compound nature is realized under the present invention. Additionally, metal-to-metal wear is eliminated, and no lubrication is required, and the achievements of these results represent additional objects of the present invention.

Another object of the present invention is to utilize such a compound bushing as the bearing between the apertured head of a vehicle torque rod and the support relative to which the torque rod is to pivot.

Other and further objects of the present invention will be apparent from the following description and claims and are illustrated in the accompanying drawings which, by way of illustration, show a preferred embodiment of the present invention and the principle thereof and what is now considered to be the best mode contemplated for applying that principle. Other embodiments of the invention embodying the same or equivalent principle may be used and structural changes may be made as desired by those skilled in the art without departing from the present invention and the purview of the appended claims.

Figure 1:
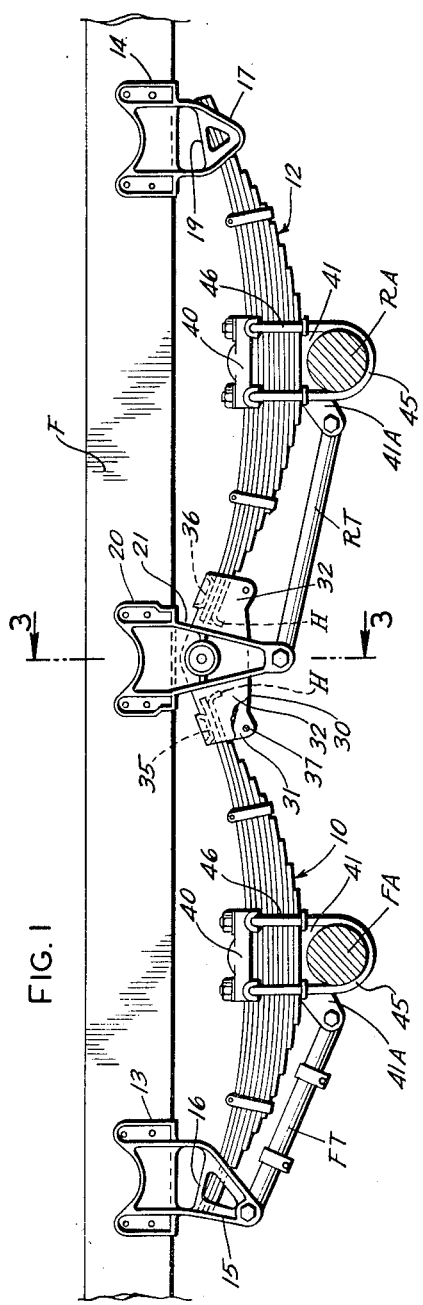
FIG. 1 is a side elevational view of a tandem spring suspension embodying the present invention, and showing the state of the suspension at a time when the associated vehicle will be on a level surface.
Figure 2:
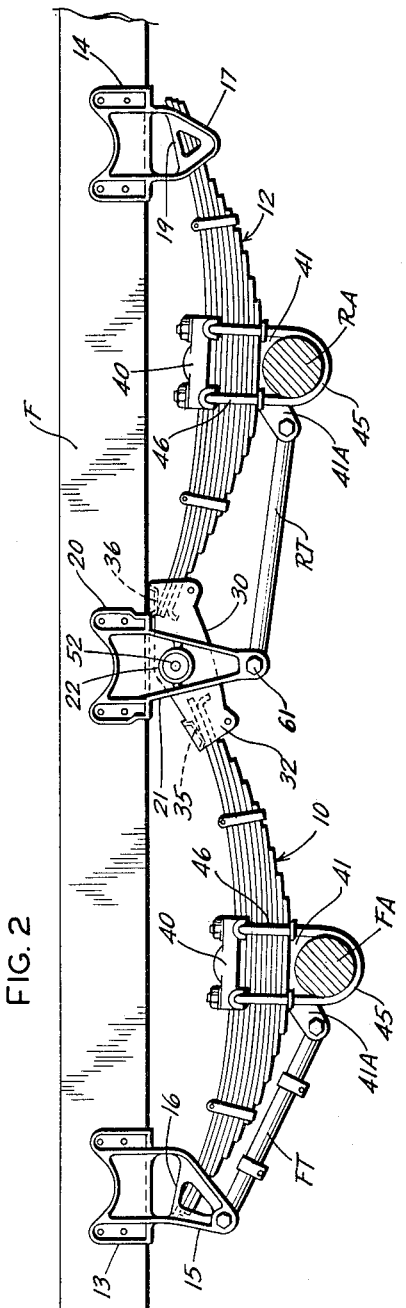
FIG. 2 is a view similar to FIG. 1 but illustrating the state of the suspension at a time when an impact has been impressed on one axle.

The suspension illustrated in FIGS. 1 and 2 is of the so-called tandem type which is to be used in connection with the front and rear axles FA and RA of a trailer vehicle. Only the frame F of this vehicle is illustrated in FIGS. 1 and 2, and suspended below the frame F are a pair of elongated semi-elliptical compound leaf springs 10 and 12 which have their opposite ends engaging supports affixed to the frame F, as will be explained, and each having a connector substantially at its medial section enabling the related axle FA or RA to be secured thereto. The structure illustrated in FIG. 1 is of course but one-half of the entire spring assembly. Thus, in the actual commercial structure, the structure illustrated in FIG. 1 is duplicated at the other side of the frame, and the four tandem springs that would thus be afforded support the opposite ends of the two axles FA and RA.

The spring suspension in the present instance is also known as an equalized suspension, that is, the arrangement is such that a heavy load imposed on one axle, as by the wheels associated with that axle encountering a hump or chuck hole in the road surface, is distributed through the spring system at least partially on to the other axle. Thus, front and rear hanger brackets 13 and 14 associated with he suspension are affixed to the outer face of the frame F. A pair of laterally spaced bifurcated arms, one of which is indicated at 15 in FIG. 1, are cast integral with the bracket 13 to depend therefrom below the bottom face of the frame F. The lateral spacing between the arms as 15 is sufficient to neatly receive the front end of the compound leaf spring 10, and this end of the spring engages the lower horizontal face of a supporting pad 16 fixed to the bracket 13 as is well known in the art. In like manner, the rear hanger bracket 14 includes laterally spaced depending arms as 17, and a pad 19 which is engaged by the rear of the compound leaf spring 12 disposed between the arms as 17. It will thus be seen that the outer ends of the two springs 10 and 12 are associated with unyielding support members that are rigidly affixed to the frame F in such a manner as to enable the outer ends of these springs to flex as required. The arrangement, as mentioned, is duplicated at the opposite side of the frame F. On the other hand, the inner adjacent ends of the two springs 10 and 12 are associated with a rocker assembly which is supported below the frame F for oscillation about a horizontal axis, and it is this rocker assembly which accounts for load equalization as will now be explained.

Figure 3:
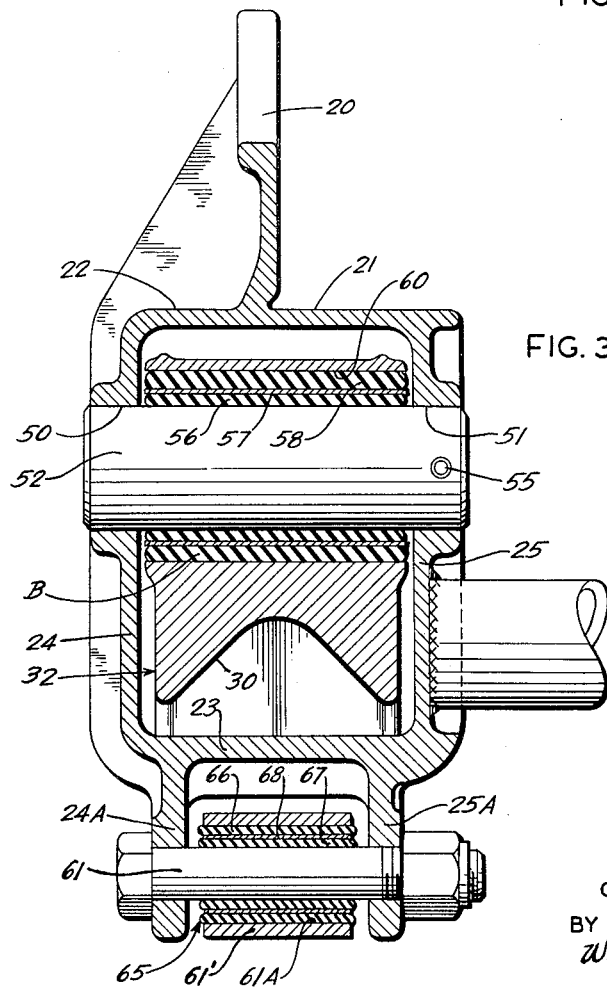
FIG. 3 is a sectional view on an enlarged scale taken on the line 3—3 of FIG. 1.

A center support bracket 20 is affixed to the outer face of the frame F medially of the front and rear hanger brackets 13 and 14. A housing 21, FIGS. 1, 2 and 3, is formed integral with the bracket 20, and as best shown in FIG. 3, this housing includes an upper wall 22, a lower wall 23 and left and right hand side walls 24 and 25, the spacing between these walls being such as to afford a relatively large mounting recess within which are located the important elements of the present invention. The housing 21 is of course rigid with the bracket 20, and disposed within the housing 21, for oscillation about a horizontal axis as will be described, is a rocker or so-called equalizer beam 30. The equalizer 30 has fore and aft bifurcated arms 31 and 32 which project beyond the opposite open fore and aft ends of the housing 21, and the spacing between each pair of arms 31 and 32 is such as to enable the inner end of the related compound spring to fit neatly therebetween so as to in effect be capped or shrouded by the arms 31 and 32. The inner ends of the springs 10 and 12 thus related to the equalizer at the opposite ends thereof engage the lower horizontal faces of respective supporting pads 35 and 36 which are rigid parts of the equalizer. It will be noted that the lowermost one of the leaves of the spring ends within the equalizer is turned down to afford a hook H, and sturdy pins 37 are extended between and secured to the lower outer corners of the arms 31 and 32. In the event that the spring suspension is subjected to severe action tending to produce substantial displacement between an inner spring end and its supporting pad 35 or 36, complete displacement of this spring end out of the equalizer housing will be prevented upon engagement between the hooked end H and the stop pin 37.

The two ends of the front axle FA are secured to a pair of the springs 10 at opposite sides of the frame F, and ends of the rear axle RA are likewise secured to a pair of springs 12 in the following manner. Thus, referring to FIGS. 1 and 2, clamp plates 40 are capped over the upper leaf spring in each compound leaf spring assembly 10 and 12, and an axle seat member 41, having a lower surface complemental to the upper surface of the related axle, is set on the upper surface of each axle at each end thereof. Each plate 40 is located to be at the geometrical center of the related spring assembly, and this is likewise true with respect to each axle and its related axle seat member 41. The axle seat members 41 have substantially flat upper surfaces which engage the lower leaf in each compound spring assembly, and it should be pointed out that the plates 40 are recessed so as to have downwardly opening channels in which the upper surfaces of the springs 10 and 12 neatly fit with the vertical side elements of the plate 40 substantially in flush engagement with the outer sides of several of the upper leaves in each spring assembly as will be apparent from FIGS. 1 and 2.

At each end of each axle where a spring 10 and 12 is provided, a pair of large size U-bolts 45 are provided, and in FIGS. 1 and 2 only one of the U-bolts 45 in each such pair is visible. The rounded bight portions of the bolts 45 are curved complemental to the axles FA and RA so as to neatly fit therewith. The two straight legs as 46 of each of the U-bolts extend upwardly, and the threaded ends of these legs extend through receiving openings at the sides of the plates 40. Nuts and lock washers are threaded on the exposed upper ends of the arms as 46 which project above the plates 40, and these are tightened to the extent that the plates 40 and 41 are drawn into tight engagement with the springs 10 and 12, and in this manner the axles FA and RA are securely locked to the springs against rotation about their own axes.

The means that thus secure the axles to the midpoints of the springs also afford attachment for aft ends of torque rods. The torque rods in turn are in effect secured at their front ends to the frame of the vehicle. Thus, each of the axle seat plates 41 has a forwardly extended arm 41A rigidly associated therewith. These arms project forwardly of the related axle, and the free ends thereof are displaced below the lower ones of the spring leaves in each instance. The arms 41A serve in each instance as anchors for related front and rear torque arms or rods FT and RT respectively. Thus, there are a pair of torque arms FT for the front axle, only one of these torque arms being visible in FIG. 1. Each torque arm FT is pivotally secured at its aft end to the related spring seat arm 41A, and the opposite or fore end of the arm FT is pivotally secured to the front hanger bracket 13. This pivot connection at the front of the torque arm FT conveniently occurs between the bifurcated arms as 15, and it should be mentioned that each arm 41A shown in FIG. 1 is one of a bifurcated pair between which the pivotal connection for the aft end of the torque arm FT is afforded.

The rear torque arms RT are likewise pivoted at their aft ends to the spring seat arms 41A associated with the rear axle RA. The fore end of each rear torque rod RT is pivotally secured to the lower end of the center bracket housing 21 which projects below the equalizer 30, and this particular mode of pivotal connection will be explained in detail hereinafter.

FIG. 1 illustrates the state of the suspension at a time when the vehicle would be running on a smooth or level surface. Under such circumstances, the axles FA and RA would lie in a true horizontal plane. Assuming, however, that the rear wheels of the vehicle encounter a hump or uneven surface, this would in effect raise the rear axle as illustrated in FIG. 2 which at the same time raises the springs as 12 connected to the rear axle. However, the inner or fore ends of the springs 12 are supported by the equalizers as 30, and hence as the springs 12 are raised the associated equalizers 30 pivot counterclockwise from the position shown in FIG. 1 to that of FIG. 2 due to the upwardly applied forces exerted on the pads as 36 by the inner ends of the springs 12. This raises the aft arms of the equalizers, but during the time that the aft ends of the equalizers 30 are being raised, the fore ends are forced downwardly, and this causes the front springs as 10 to be slightly canted oppositely of the springs 12 due to the load impressed thereon at their inner ends by the pads 35 of the equalizers. In this way, the severe load that would have been impressed wholly on the springs 12 is distributed in part to the front springs 10 through the equalizers 30, and of course the equalizers 30 must be free to oscillate or pivot to enable the desired distribution of stresses to be realized. The same principle holds true when considering a severe load impressed on the front axle, the only difference being that in this instance the equalizers 30 would pivot clockwise as viewed in FIG. 1 to distribute part of the load to the springs 12.

It will be realized from the foregoing that each equalizer 30 plays an important role in the successful operation of an equalized tandem leaf spring assembly, and the present invention is concerned primarily with an improvement in the operation of the equalizing mechanism. Thus, referring to FIG. 3, which is a vertical section through the equalizing mechanism, it will first be noted that the medial section of the equalizer 30 is, as was explained above, confined within the four walls of the center bracket housing 21. The two side walls 24 and 25 of the center bracket housing 21 are formed with openings 50 and 51, and an equalizer support shaft or pin 52 has the opposite ends thereof mounted in the openings 50 and 51, this support shaft or pin being locked against rotation by a key or lock pin 55 which has sections respectively engaging the shaft 52 and solid portions of the housing 21 which define the opening 51. Thus, pivotal movement of the equalizer 30 occurs relative to the shaft 52 representing the fixed axis or fulcrum relative to which the equalizer 30 is to pivot.

It is recognized that some sort of control should be established for the extent or precise nature of oscillation of the equalizer 30, and there have been different proposals in the past in this regard. Thus, pivoting of the equalizer should not be so swift as to encourage vibration of the system, and on the other hand it should not be so slow or tight as to result in too much delay in performing the essential load equalizing function. In accordance with the present invention, controlled movement of the equalizer is produced by a three-part bushing which includes a pair of concentric rubber bearings that are separated by a metallic sleeve to which the two rubber bearings are firmly united. For any given shaft 52 of predetermined diameter, the metallic sleeve included in the three-part bushing can be of a given diameter substantially larger than the diameter of shaft 52, but different sets of such bushings can be varied as to the thickness of the two rubber bearings that are respectively located concentrically inward and outward of the interposed metallic sleeve. Accordingly, for given load conditions or expected load requirements, a bushing can be selected which will establish the desired degree of control over load equalizing merely by appropriately selecting a bushing having rubber bearings of appropriate thickness.

Figure 5:
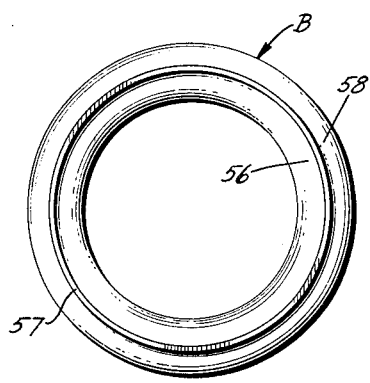
FIG. 5 is an end view of the bushing.
Figure 4:
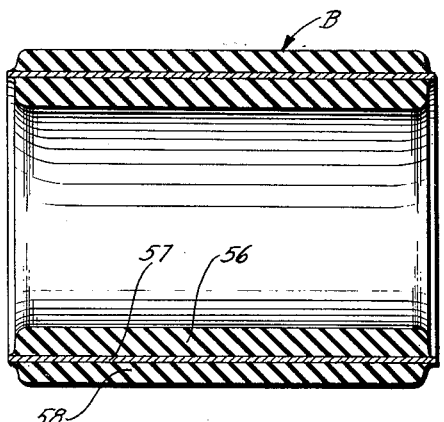
FIG. 4 is a sectional view of a bushing utilized under the present invention.

Thus, referring to FIGS. 3, 4 and 5, a compound bushing B is to be interposed between the equalizer support shaft 52 and the equalizer 30 disposed within the housing 21. The bushing B is essentially of three parts, namely, an inner rubber bearing 56 of symmetrical sleeve shape having the outer surface thereof bonded, as by vulcanization or rubber-to-metal cement, to the inner surface of a metallic sleeve 57, and finally an outer rubber bearing 58, of symmetrical sleeve shape having its inner surface bonded in like manner to the outer surface of the sleeve 57. The inside diameter of the inner bearing 56 receives the supporting shaft 52, and the outer bearing 58 is to be received in a complemental 360° bushing-receiving opening 60 formed at the medial section of the equalizer 30 disposed within the housing 21.

The bushing assembly B as a whole is to be press-fitted into the round opening 60 at the center of the equalizer, and the fulcrum shaft 52 is to be press-fitted into the bearing part 56 of the bushing B. Resultantly, the outer bearing 58 will be under a predetermined degree of compression between the equalizer 30 and the metallic sleeve 57; in turn, the inner bearing 56 will be independently under a predetermined and different degree of compression between the sleeve 57 and the supporting shaft 52. In other words, the states of compression of the two bearings 56 and 58 are different, that is, are mutually exclusive and independent one of the other, so that, considered as a total effect, the frictional force resisting slippage of the inner bearing 56 on the support 52 is different than the frictional force resisting slippage of the equalizer 30 on the outer bearing 58.

The bushing B when thus assembled of course represents the essential bearing element being required in any event in order that there will be assured freedom of movement of the equalizer at all times, and of course it will be recognized that the bearing in the present instance when thus considered is one that requires no lubrication and is one wherein there is no metal-to-metal contact between any of the relatively movable equalizing parts. Moreover, the bearing assembly is secured in place without having resort to clamping, keying or pinning devices. In other words, securement of the bushing in interposed relation between the equalizer and its support is due alone to the press-fits mentioned.

The extent of compression of the inner bearing sleeve 56 can be controlled by varying its inside diameter to establish a predetermined amount of locking pressure between the bearing 56 and the support shaft 52. Likewise the amount of compression of the outer bearing or sleeve 58 can be controlled by varying its diameter to establish a predetermined amount of locking pressure on the equalizer.

Figure 6:
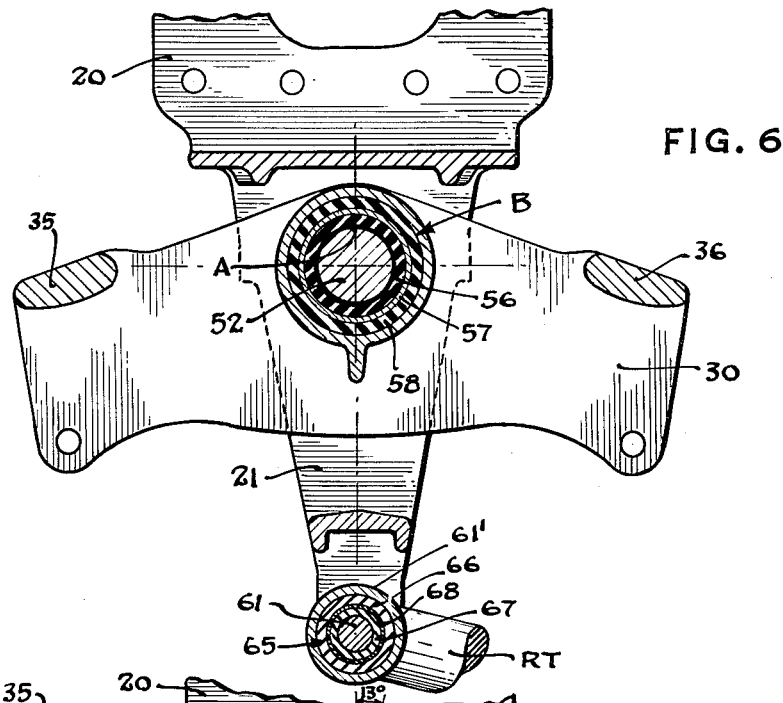
FIGS. 6, 6A and 6B illustrate conditions that prevail at various angles of tilt of the equalizer.
Figure 6A:
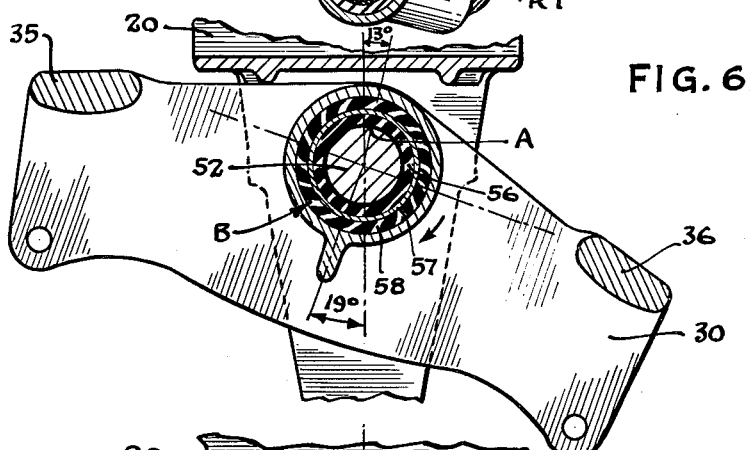
Figure 6B:
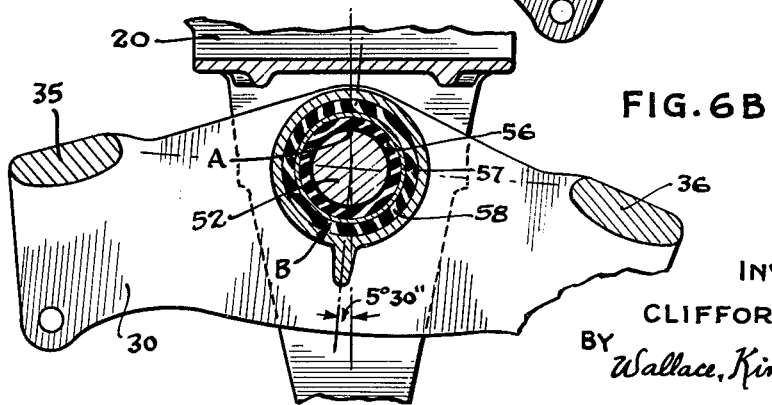

FIGS. 6, 6A and 6B show the relationships that can prevail in one embodiment of the invention. The equalizer 30, FIG. 6, is in a neutral position, that is, a non-tilted condition characterizing the disposition of the tandem spring suspension parts as viewed in FIG. 1. The bearings 56 and 58 are so selected that the equalizer will not slip on the outer bearing 58 for any angle of tilt thereof within its possible range of tilting up to about 20°. In other words, for all possible angular movement of the equalizer, the outer rubber element 58 is twisted or wrapped up between the sleeve 57 and the equalizer 30 in resisting oscillation of the equalizer. The inner rubber element 56 also twists, but when an angle of about 15° of oscillation of the equalizer is exceeded, the inner rubber element is twisted to a point where its grip on the shaft 52 is overcome. The bushing assembly B as a whole now slips on the shaft 52, and this is the condition shown in FIG. 6A where the equalizer 30 has oscillated to its maximum limit where it abuts the underside of the bracket 20. Under this condition, the inner rubber bearing 56 is no longer twisted and it has slipped on the pivot 52 to displace point "A" thereof, FIG. 6, clockwise to the position shown in FIG. 6A.

Thus, up to an angle of about 15°, both the sleeve-like rubber elements 56 and 58 are twisted in resisting oscillation of the equalizer. For small angular equalizer movements, say 3° or 4°, the outer bearing 58 substantially alone resists tilting of the equalizer to a controlled degree and permits relatively swift equalizer movement. In the range of about 5° to 15°, both bearings 56 and 58 are twisted, the outer one to a greater degree, the inner one to a lesser degree, such that both rubber bearings exert their spring rate in resisting equalizer movement. This condition is illustrated in FIG. 6B where the equalizer has been oscillated approximately 5° out of neutral position. Here, the outer bearing is twisted, and also the inner bearing, but it will be observed that point "A" of the inner bushing 56, FIG. 6B, is still in the same neutral position that it occupies in FIG. 6.

Thus it will be seen that the frictional force exerted by the outer rubber element 58 on the equalizer 30 is sufficient to in effect bind the one to the other so that the equalizer does not slip on the outer rubber element 58. At progressively larger angles of equalizer oscillation, the inner rubber element 56 twists more and more with the outer rubber element and therefore interposes increasing resistance to equalizer oscillation at the higher angles. Resistance thus takes on an exponential effect, or a geometric progression characterizing a stronger and stronger spring effect in the bushing B as a whole against which the equalizer must move, until an angle of about 15° of equalizer tilt is reached whereat the bushing B as a whole slips on the pin 52 permitting a swift movement of the equalizer in distributing the load between the axles.

Advantageously, the torque rods as FT and RT are pivoted at their opposite ends to the arms 41A and the brackets affixed to the frame by means including compound bushings of the kind used to control the action of the equalizer. Thus, it has been explained above that the torque rods are pivotally connected at their aft ends to the arms 41A which are affixed to the vehicle axles, and that the fore ends thereof are pivotally connected to the brackets as 13 and 21. Inasmuch as the compound bushings that afford such pivotal supports for the torque rods are identical in each instance, the description to follow will be restricted to the manner in which the fore end of the torque rod RT is connected to the lower end of the center bracket 21.

Thus, referring to FIG. 3, it will be noted that the side walls 24 and 25 of the equalizer housing have depending arms 24A and 25A. These arms are formed with aligned openings, and a bolt 61 is passed therethrough. The portion of the shank of the bolt 61 which lies inside the arms 24A and 25A represents the primary support for the fore end of the torque rod RT relative to which the torque rod is free to pivot. Thus, the torque rod RT is formed with an enlarged head 61', FIG. 3, and this head has a 360° aperture 61A having an inside diameter substantially larger than the diameter of the shank of the bolt 61. It will be appreciated that the opposite end of the torque rod RT is formed with a like apertured head, and this is also true of the opposite ends of the front torque rod FT, bolts as 61 also being secured to the front bracket 13 and the arms 41A to which the fore and aft ends of the associated torque rods are connected.

A compound bushing 65, FIG. 3, is interposed between the aperture 61A of each torque rod and its supporting bolt. Each such bushing 65 includes an outer rubber bearing sleeve 66, an inner rubber bearing sleeve 67, and a rigid spacing sleeve 68 interposed between the two bearings 66 and 67. As in the instance of the bushing B described above, the bearings are independently bonded to the sleeve 68, and diameters of the bearings 66 and 67 are so selected as to have independent and different states of compression between the rigid parts associated with the two bearings. Thus, the outside diameter of the bearing 66 will be of predetermined larger diameter in comparison to the inside diameter of the aperture 61A in the torque rod. Further, the inside diameter of the inner bearing 67 will be of predetermined smaller dimension in comparison to the outside diameter of the support bolt 61. Hence, when the bushing assembly 65 as a whole is inserted into its torque rod aperture, the resultant press-fit will place the outer bearing 66 under a predetermined state of compression. When the bolt 61 is next pressed into and through the inner bearing 67, the latter will be under a predetermined state of compression wholly independent of the state of compression of the outer bearing 66. By so resorting to a compound bushing 65, control can be exerted over pivotal movement of the torque rods which of course undergo pivotal action concurrently with up and down motions of the axles FA and RA, and can in fact be specifically related to the equalizer control exerted by the bushing B.

In the preferred embodiment of the invention illustrated in the drawings, particularly FIGS. 6, 6A and 6B, the different states of compression of the inner and outer bearings, both for the compound bushing B and the compound bushing 65, are such that the frictional force between the outer bearing and the outwardly concentric member that oscillates with respect thereto is greater than the frictional force between the inner rubber bearing and the fixed support as 52 and 61. Therefore, the compound bushings as a whole will slip on their supports 52 and 61 at a particular angle of tilt of the equalizer 30 or the torque rod head 61' before there is any slippage of the latter on the respective outer rubber bearing sleeve.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a tandem spring suspension for a vehicle having tandem axles: a pair of elongated spring means having spaced outer ends and adjacent inner ends; an equalizer having spaced fore and aft parts engageable respectively by the inner ends of the spring means and having an opening at its medial section; a support for the equalizer coaxial with the opening thereof enabling the equalizer to pivot about said support as the result of a force impressed on the equalizer by an inner end of one of the spring means; and a compound bushing interposed between said support and the opening of said equalizer; said bushing consisting essentially of (1) a center sleeve of rigid material, (2) an inner bearing of resilient material firmly secured to the inner surface of said sleeve, and (3) an outer bearing of resilient material firmly secured to the outer surface of said sleeve, said inner bearing engaging said support with a frictional force and said outer bearing engaging said medial section of the equalizer with a different frictional force, whereby at small angles of equalizer tilt the bearings merely twist while at predetermined large angles of equalizer tilt the bushing as a whole slips on said support, overcoming frictional resistance between the inner bearing and said support.

2. In a tandem spring suspension for a vehicle having tandem axles: tandem spring means, an equalizer pivotally arranged in the suspension to distribute loads between said springs, a support for the equalizer on which the equalizer is pivotally arranged as aforesaid, and a compound bushing interposed between said support and the opening of said equalizer, said bushing including a center sleeve of rigid material, an inner bearing of resilient material firmly secured to the inner surface of said sleeve, and an outer bearing of resilient material firmly secured to the outer surface of said sleeve, said inner bearing engaging said support with a predetermined frictional force and said outer bearing engaging said equalizer with a different frictional force, whereby at small angles of equalizer tilt the bearings merely twist while at predetermined large angles of equalizer tilt the bushing as a whole slips on said support, overcoming frictional resistance between the inner bearing and said support.

3. In a tandem spring suspension for a vehicle having tandem axles disposed beneath a frame and which undergo vertical movement when uneven surfaces are encountered in the road: a pair of elongated spring means secured to the axles in tandem relation at each side of the frame to absorb the load when an axle moves as aforesaid, the spring means in each pair having spaced outer ends supported by said frame and having adjacent inner ends; an equalizer for each pair of springs and having spaced fore and aft parts engageable respectively by the inner ends of the spring means in each pair to equalize the load between the axles during axle movement as aforesaid, said equalizer being formed with an opening at its medial section; a fixed support for the equalizer secured to the frame and being coaxial with the opening in the equalizer enabling the equalizer to pivot about said support as the result of a force impressed on one of the parts of the equalizer by an inner end of one of the spring means having a load impressed thereon to thereby distribute part of the load to the inner end of the other spring means in the related pair; and a compound bushing interposed between said support and the opening of said equalizer; said bushing including but three elements only, namely, a center sleeve of rigid material, an inner bearing of resilient material firmly secured to the inner surface of said sleeve, and an outer bearing of resilient material firmly secured to the outer surface of said sleeve, said inner bearing engaging said support and being in a predetermined state of compression between said sleeve and said support to exert a predetermined frictional force on said support, and said outer bearing being disposed in said opening and being in a predetermined state of compression between said sleeve and said medial section of the equalizer to exert a frictional force thereon different than the first-named force, whereby the outer bearing resists to a predetermined degree pivoting action of the equalizer through small angles thereof independent of bodily movement of the bushing as a whole and whereby the inner bearing resists to a predetermined degree circumferential bodily slippage of the bushing as a whole relative to said support but permits such slippage at predetermined large angles of the equalizer.

4. In a tandem spring suspension for a vehicle having tandem axle members disposed beneath a frame and which are adapted to undergo vertical movement when uneven surfaces are encountered in the road: individual tandem spring means secured respectively to the axle members to absorb the load when an axle member moves as aforesaid, the spring means having spaced outer ends supported to react on said frame member and having adjacent inner ends; an equalizer having spaced fore and aft parts engageable respectively by the inner ends of the spring means; a fixed support for the equalizer connected to the frame member and enabling the equalizer to pivot about said support as a result of a force impressed on the equalizer by an inner end of one of the spring means having a load impressed thereon to thereby distribute part of the load to the inner end of the other spring means; and a compound bushing interposed between said support and said equalizer, said bushing including a center sleeve of rigid material, an inner bearing of resilient material bonded to the inner surface of said sleeve and an outer bearing of resilient material bonded to the outer surface of said sleeve, one of said bearings engaging said support with a given frictional force, and the other bearing engaging said equalizer with a greater frictional force, whereby the outer bearing resists to a predetermined degree pivoting action of the equalizer independent of bodily movement of the bushing as a whole and whereby the inner bearing resists to a predetermined degree circumferential bodily slippage of the bushing as a whole relative to said support during equalizer movement but permits such slippage at predetermined large angles of the equalizer.

5. In a tandem spring suspension for a vehicle having tandem axle members disposed beneath a frame member and which undergo vertical movement when uneven surfaces are encountered in the road: a pair of elongated spring means secured to the axle members in tandem relation at each side of the frame member to absorb the load when an axle member moves as aforesaid, the spring means in each pair having spaced outer ends supported by said frame member and having adjacent inner ends; an equalizer for each pair of springs and having spaced fore and aft parts engageable respectively by the inner ends of the spring means in each pair to equalize the load between the axle members during axle movement as aforesaid, said equalizer being formed with an opening at its medial section; a fixed support for the equalizer secured to the frame member and being coaxial with the opening in and enabling the equalizer to pivot about said support as the result of a force impressed on one of the parts of the equalizer by an inner end of one of the spring means having a load impressed thereon to thereby distribute part of the load to the inner end of the other spring means in the related pair; and a compound bushing interposed between said support and the opening of said equalizer; said bushing including a center sleeve of rigid material, an inner bearing of resilient material bonded to the inner surface of said sleeve, and an outer bearing of resilient material bonded to the outer surface of said sleeve, said inner bearing engaging said support and being in a predetermined state of compression between said sleeve and said support to thereby grip said support with a given frictional force, said outer bearing being disposed in said opening and being in a predetermined state of compression between said sleeve and said medial section of the equalizer to exert a frictional force on the equalizer different than the first-named frictional force; whereby said bearings are merely twisted at predetermined small angles of equalizer tilt while the bushing slips as a whole on said support at predetermined large angles of equalizer tilt overcoming the frictional force between said support and said inner bearing; and torque rods pivotally secured at aft ends thereof respectively to said axle members and having the fore ends thereof pivotally secured to the frame member so as to move bodily up and down with the axles during axle movement as aforesaid, each end of said torque rods including an apertured head thereon disposed adjacent one of said members; a compound bushing inserted into said apertured head and including an outer resilient bearing, an inner resilient bearing and a rigid spacer sleeve therebetween which is firmly joined at its outer and inner surfaces respectively to the opposed surfaces of the outer and inner bearings associated with said torque rod apertured head; said related member having a pin supported thereby, the inner bearing of the bushing associated with said apertured head being in a predetermined state of compression between the pin and the associated sleeve to grip the pin with a given frictional force, and the outer bearing of the bushing associated with said apertured head being in a predetermined state of compression between the apertured head and the associated sleeve to exert a frictional force applied to said pin.

6. In a tandem spring suspension for a vehicle having tandem axle members disposed beneath a frame member and which undergo vertical movement when uneven surfaces are encountered in the road, individual spring means secured to the axle members to absorb the load when an axle moves as aforesaid, said spring means having spaced outer ends and adjacent inner ends; an equalizer having parts engageable respectively by the inner ends of the spring means to equalize the load between the axle members during axle movement as aforesaid; a fixed support for the equalizer secured to the frame to enable the equalizer to pivot about said support as the result of a force impressed on one of the parts of the equalizer by an inner end of one of the spring means having a load impressed thereon to thereby distribute part of the load to the inner end of the other spring means; and a compound bushing interposed between said support and said equalizer; said bushing including a center sleeve of rigid material firmly secured to the inner surface of said sleeve, and an outer bearing of resilient material firmly secured to the outer surface of said sleeve, said inner bearing engaging said support and being in a predetermined state of compression between said sleeve and said support, said outer bearing being disposed in said opening and being in a predetermined state of different compression between said sleeve and said medial section of the equalizer, whereby the inner and outer bearings exert different frictional forces respectively on said support and said equalizer so that at predetermined small angles of equalizer tilt said bearings are merely twisted while at predetermined large angles of equalizer tilt the frictional force between said support and said inner bearing is overcome permitting bodily slippage of the bushing as a whole about said support, and torque rods pivotally secured at aft ends thereof respectively to said axle members and having the fore ends thereof pivotally secured to the frame member so as to move bodily up and down with the axles during axle movement as aforesaid, selected of the secured ends of said torque rods including an apertured head thereon related to one of said members; a compound bushing inserted into said apertured head and including an outer resilient bearing, an inner resilient bearing and a rigid spacer sleeve therebetween which is firmly joined at its outer and inner surfaces respectively to the opposed surfaces of the outer and inner bearings associated with said torque rod apertured head; said related member having a pin supported thereby, the inner bearing of the bushing associated with said apertured head being in a predetermined state of compression between the pin and the associated sleeve, and the outer bearing of the bushing associated with said apertured head being in a predetermined state of different compression between the apertured head and the associated sleeve.

7. In a tandem spring suspension: an equalizer, a support relative to which the equalizer is free to pivot and said support being disposed coaxially within an opening in the equalizer; and a compound bushing interposed between said support and the solid portions of said equalizer which define the opening therein; said bushing including a center sleeve of rigid material, an inner bearing of resilient material firmly secured to the inner surface of said sleeve, and an outer bearing of resilient material firmly secured to the outer surface of said sleeve; said inner bearing engaging said support and being in a predetermined state of compression between said sleeve and said support, and said outer bearing engaging said solid surfaces and being in a predetermined state of different compression between said sleeve and said solid surfaces, whereby at small angles of equalizer tilt the bearings merely twist while at predetermined large angles of equalizer tilt the bushing as a whole slips on said support, overcoming frictional resistance between the inner bearing and said support.

8. In an equalized tandem spring suspension: a pair of spring means, an equalizer having spaced parts engageable by respective portions of the spring means, means affording a pivot for the equalizer, and a compound bushing interposed between the equalizer and the pivot means, said bushing including inner and outer bearings of resilient material and a rigid spacer between the bearings, said outer bearing being under a predetermined state of compression between said spacer and said equalizer, and said inner bearing being under a predetermined state of different compression between said spacer and said support, the states of compression of the two bearings being independent of one another whereby the outer bearing exerts a predetermined frictional force on the equalizer resisting the tendency of the equalizer to slip thereon, whereby said bearings are merely twisted at small angles of equalizer tilt and whereby the inner bearing exerts a predetermined and different frictional force on the pivot means tending to prevent slippage of the bushing as a whole about said pivot means but permitting slippage of the bushing as a whole about said pivot means at a predetermined large angle of equalizer tilt.

9. In a vehicle wherein a torque rod is extended from an axle to the frame of the vehicle: a torque rod having an apertured head at one end thereof and through which a support member of predetermined diameter is to be coaxially extended, and a compound bushing having an inner and outer bearing sleeve of resilient material and a spacer sleeve of rigid material interposed between said bearing sleeves, said outer bearing having an outside diameter larger than the diameter of the aperture in said apertured head to be in a predetermined state of compression between the spacer sleeve and said apertured head to exert a frictional force on said apertured head, and said inner bearing having an inside diameter smaller than the diameter of said support member to be in a predetermined state of compression between said spacer sleeve and said support member different from the first-named state of compression and establishing a frictional forec on said support different from the first-named frictional force.

10. In a vehicle axle torque rod wherein the torque rod has an apertured head at one end pivoted on a support, a compound bushing interposed between the support and the aperture of the torque rod, said bushing including inner and outer bearing sleeves of resilient material and a spacer sleeve of rigid material interposed between said bearings and to which the bearings are independently united, said bearings having diameters predetermined as placing the bearings in different and independent states of compression when the bushing is so interposed.

References Cited by the Examiner
UNITED STATES PATENTS

| | | | |
|---|---|---|---|
| 2,049,024 | 7/36 | Robertson | 287—85 |
| 2,051,864 | 8/36 | Knox | 287—85 X |
| 2,095,947 | 10/37 | Herold | 267—57.1 |
| 2,308,967 | 1/43 | Kuss. | |
| 2,719,711 | 10/55 | Wallinger | 267—54 X |
| 2,754,132 | 7/56 | Martin. | |
| 2,853,325 | 9/58 | Ward. | |
| 2,880,991 | 4/59 | Ward | 267—67 |

A. HARRY LEVY, *Primary Examiner.*

PHILIP ARNOLD, *Examiner.*

UNITED STATES PATENT OFFICE
CERTIFICATE OF CORRECTION

Patent No. 3,195,916                                                  July 20, 1965

Clifford G. Cain

It is hereby certified that error appears in the above numbered patent requiring correction and that the said Letters Patent should read as corrected below.

In the grant, lines 2 and 3, for "assignor to Alaska Juneau Gold Mining Company, of Springfield, Missouri, a corporation of West Virginia," read -- assignor to A. J. Industries, Inc., a corporation of West Virginia, --; line 12, for "Alaska Juneau Gold Mining Company, its successors" read -- A. J. Industries, Inc., its successors --; in the heading to the printed specification, lines 3 to 5, for "assignor to Alaska Juneau Gold Mining Company, Springfield, Mo., a corporation of West Virginia" read -- assignor to A. J. Industries, Inc., a corporation of West Virginia --.

Signed and sealed this 8th day of February 1966.

(SEAL)
Attest:

ERNEST W. SWIDER                                  EDWARD J. BRENNER
Attesting Officer                                 Commissioner of Patents